July 29, 1969   R. W. MELDRUM   3,457,801

MOTION ARRESTING DEVICES

Filed Aug. 9, 1967

INVENTOR
RAYMOND WALTER MELDRUM
BY Harris and Barley
ATTORNEYS

United States Patent Office 3,457,801
Patented July 29, 1969

3,457,801
MOTION ARRESTING DEVICES
Raymond Walter Meldrum, Harpenden, England, assignor to International Computers and Tabulators Limited, London, England, a British company
Filed Aug. 9, 1967, Ser. No. 659,415
Claims priority, application Great Britain, Aug. 16, 1966, 36,606/66
Int. Cl. G05g 5/06
U.S. Cl. 74—527                                10 Claims

ABSTRACT OF THE DISCLOSURE

An interposer mechanism for selectively arresting the motion of a slide member at a number of positions relative to a base member in which two balls are held in a cavity in one of the members, one of the balls being displaceable to lock the other ball and the other ball being displaceable to engage in recesses in the other member to arrest the motion of the other member. Two opposite walls of the cavity converge toward one another at the opening of the cavity and the balls are urged selectively toward the opening by fluid streams in the cavity. The balls are at rest in inoperative positions in the cavity when no fluid is applied. When fluid is applied to act on one ball it moves towards the opening and becomes wedged between the other ball and the cavity wall thereby locking the other ball in its inoperative position. When fluid is applied to the other ball it moves past the one ball into a position where it projects from the cavity. Reverse movement of the slide member displaces the ball back into the cavity.

BACKGROUND OF THE INVENTION

The present invention relates to devices for arresting relative motion between two members.

It has previously been proposed, in apparatus having a slide member movable along a rectilinear path relative to another member, to provide a plurality of teeth on one member and a pawl on the other member. The pawl is operable to engage with any selected one of the teeth to arrest the slide member at a required position. The pawl is usually actuated by means of mechanical linkages or by the use of an electromagnetically operated mechanism. However, neither of the above means can conveniently be used when it is desired to control the movement of the slide member by apparatus operated by fluid streams and hitherto it has been necessary to provide a piston or plunger actuated mechanism controlled by the fluid operated apparatus. Such mechanisms usually require considerable power for their operation due to the high mass and/or friction involved in moving the pistons or plungers.

SUMMARY OF THE INVENTION

According to the invention, apparatus includes a first member having a first face; a second member having a second face, the first member being positioned with its first face adjacent said face; said first member having a recess in said first face; said second member having a chamber therein opening in said second face, two opposite walls of said chamber converging toward one another at the opening of the chamber; an interposed element and a locking element in said chamber; and means for applying fluid to said chamber to move a selected one of said elements from a rest position to an operative position; said locking element when in its operative position being effective to engage between the interposer element and one of said walls of the chamber so as to lock the interposer element in its rest position; said interposer element when in its operative position being effective to project into the recess in said first member and thereby arrest movement between said members.

DESCRIPTION OF THE PREFERRED EMBODIMENTS

Figure 1:
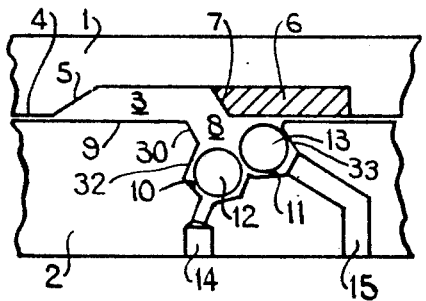
FIGURE 1 is a part sectional view of a slide and base member showing the interposer element locked in its inoperative position.
Figure 2:
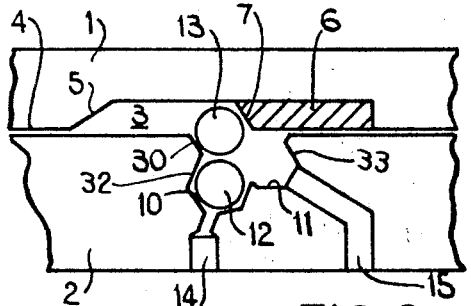
FIGURE 2 is a part sectional view similar to FIGURE 1 showing the interposer element in its operative position.
Figure 3:
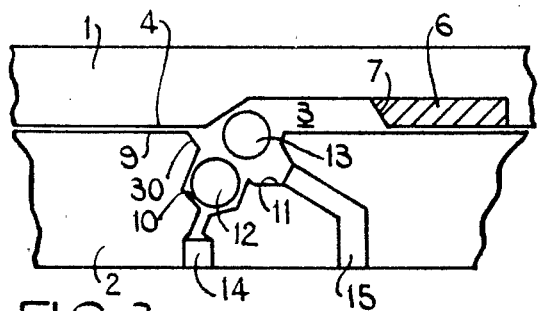
FIGURE 3 is a part sectional view similar to FIGURE 1 showing the resetting of the interposer element.

Referring first to FIGURES 1, 2 and 3 of the drawing, in which the parts are indicated by the same reference numerals in each of these figures, a slide member 1 is supported, by means not shown, for rectilinear movement relative to a stationary arresting block 2. The slide member 1 has a recess 3 formed in that face 4 which is adjacent the block 2. One end of the recess 3 has a sloping wall 5 whilst a pad 6, of synthetic plastic material such as Delrin, is inserted in the other end of the recess 3. The pad 6 is formed with an arresting face 7.

The arresting block 2 has a chamber 8 formed therein, which chamber opens through the surface 9 of the block 2 adjacent the slide member 1. The chamber 8 is formed of two cavities 10, 11. The cavity 10 extends deeper into the block 2 than the cavity 11 and a locking ball 12 is located in the cavity 10. An interposer ball 13 is located in the cavity 11. The balls 12 and 13 are a loose fit in the cavities so that they may be moved freely in the cavities. Fluid supply passages 14, 15 connect with the cavities 10, 11 respectively. The walls 32 and 33 of the cavities 10 and 11, respectively, converge toward each other at the opening of the chamber 8.

When fluid is not applied to either passage 14 or 15 the balls 12, 13 are in rest positions in which both balls are below the surface 9 of the block 2. If fluid is applied through passage 14 to cavity 10, the locking ball 12 is displaced from its rest position toward the opening of the chamber 8. However, due to the convergence of the opposite walls 32 and 33 of the chamber 8, the ball 12 is unable to pass beyond the ball 13 and in consequence the two balls are locked between the walls of the chamber as shown in FIGURE 1. Thus the interposer ball 13 is held in its rest position by the ball 12. If fluid is applied through passage 15 to cavity 11, instead of being applied through passage 14 to cavity 10, the locking ball 12 remains in its rest position and the interposer ball 13 is displaced from its rest position and is able to pass beyond the locking ball 12 and then to project beyond the surface 9 of the block 2, as shown in FIGURE 2.

Figure 4:
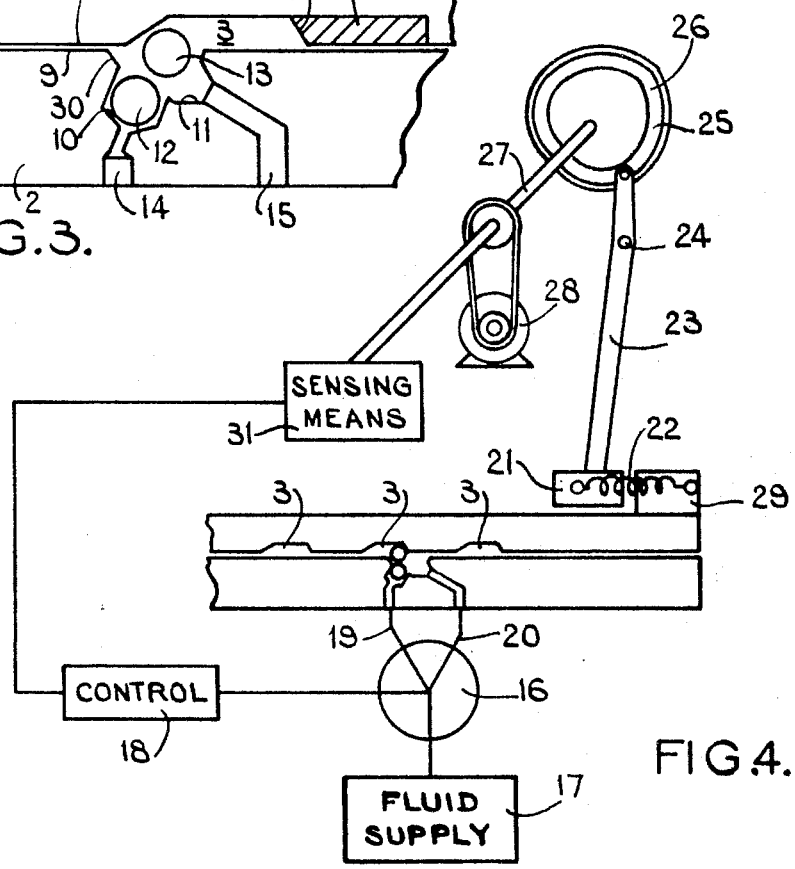
FIGURE 4 shows diagrammatically the operating mechanism and control means for a slide member.

The passages 14, 15 are connected to fluid sources. Suitable sources for this purpose are the output channels of fluid logic devices, for example the two output channels of a pure fluid amplifier switch 16 as shown in FIGURE 4. In the switch 16, a fluid stream, termed a power stream, from a fluid supply 17 is influenced by a control stream generated by control means 18. When there is no control stream applied to the switch 16, the power stream passes out of the switch 16 through output channel 19. However, when the control stream is applied, the power stream is deflected to cause it to pass through output channel 20. The slide is moved by a bail 21 connected to the slide 1 by a spring 22. The bail 21 is carried by a lever 23 pivoted at 24 and the other end of the lever 23 carries a cam follower which engages in a groove 25 of cam 26. The cam 26 is mounted for rotation with a shaft 27 which is driven by a motor 28. Thus about pivot 24 and thereby causes the bail 21 to reciprocate. When the bail 21 moves in a direction from right to left in the drawing, the spring 22 causes a similar movement of the slide 1 and when the bail moves in the reverse direction it engages an abutment 29 on the slide and moves the slide back from left to right.

Assume now that the slide 1 is moving in a direction from right to left, in the drawing, and that it is required to arrest this movement. The fluid amplifier switch 16 is switched by the control means 18 either before or during the period when the required one of the recesses 3 of the slide 1 is opposite the chamber 8. Switching of the switch 16 terminates the supply of fluid to the cavity 10 and supplies fluid to the cavity 11. This displaces the interposer ball 13, from its rest position, and moves the ball 13 over the locking ball 12. If one of the recesses 3 of the slide 1 is opposite the chamber 8 at this time, the ball 13 will move into its operative position in which it projects from the surface 9 of the block 2. If, at this time, the recess 3 has not yet moved opposite the chamber 8, the ball 13 will be restrained by the surface 4 of the slide 1 from projecting from the surface 9 of the block until the recess 3 arrives into a position to allow this projection. In either case, however, the ball 13 will project into the recess 3 as the recess moves opposite the chamber 8. Continued movement of the slide results in the ball 13 moving completely over the ball 12 until it is engaged between the arresting face 7, the pad 6 and a complementary face 30 formed at one end of the chamber 8, as shown in FIGURE 2 of the drawing. The ball 13 now prevents further movement of the slide.

The ramp 5 provided at the opposite end of the recess 3 to the arresting face 7 is used to aid resetting of the ball 13, as shown in FIGURE 3. The slide 1 is mechanically restored in its original position by the bail 21, so that it now moves from left to right as shown in the drawing. It is assumed that the slide has previously been arrested, in the manner described, by the projection of the ball 13 into the recess 3. As the slide 1 is restored, the ramp 5 engages the ball 13 and moves it back over the ball 12 into the cavity 11. It will be realised that although in practice the fluid amplifier would by this time also have been reset, so that fluid would be flowing into cavity 10, the restoration of the ball 13 into cavity 11 will take place whichever passage is currently receiving fluid flow. Moreover, the resetting of the amplifier thereafter, at any time when the recess 3 is not opposite the chamber 8, will result in the ball 13 being locked by the ball 12 in the non-projecting position described with reference to FIGURE 1.

It will be realised that, in order to allow the slide 1 to be selectively arrested at a required one of a number of positions it is necessary that the fluid switch should be switched in timed relationship with the movement of the slide recesses 3 past the arresting block 2. For this purpose sensing means 31 is provided, which may consist of a slotted disc on the shaft 27 and a photoelectric sensing device for detecting the passage past a light source of the slots of the disc, for producing signals in timed relationship with the rotation of the shaft 27. These signals are applied to the control means 18 for controlling the timing of application of the control stream to the switch 16.

It is also to be understood that whereas the foregoing description has assumed that the arresting block 2 is stationary while the slide 1 is moved, the arresting arrangement described in equally applicable in the case where the recesses 3 are provided in a stationary member and the arresting block 2 is carried by a moving member. Thus, the arrangement described is suitable for arresting relative movement between an arresting block and a recessed member. Furthermore, it will also be realised that rollers or other discrete members may alternatively be used instead of the balls described provided that such members are loosely carried within the cavities 10 and 11 and provided that they are of sufficiently low mass to be moved into operative positions by the flow of fluid applied to the cavities from the controlling devices, such as fluid logic elements.

When balls are used as the locking and interposer members, the cavities 10 and 11 are of cylindrical form with circular cross section and may be formed in the block by drilling. If rollers are used in place of balls then the cavities would have rectangular cross section.

Just as selective arresting of movement between a recessed member such as the slide 1 and a member carrying the balls 12 and 13 may be accomplished by providing a number of recesses in one member and only a single pair of balls in the other, it will be realised that a similar selection of arresting positions may be accomplished by providing only a single recess in the one member in association with a number of arresting stations in the other member, each station having a pair of balls corresponding to the balls 12 and 13. In this case, selection of a particular arresting position is dependent upon the operation of the arresting ball at an appropriate arresting station.

I claim:

1. Apparatus including a first member having a first face; a second member having a second face, the first member being positioned with its first face adjacent said second face; said first member having a recess in said first face; said second member having a chamber therein opening in said second face, two opposite walls of said chamber converging toward one another at the opening of the chamber; an interposer element and a locking elemet in said chamber; and means for applying fluid to said chamber to move a selected one of said elements from a rest position to an operator position; said locking element when in its operative position being effective to engage between the interposer element and one of said walls of the chamber so as to lock the interposer element in its rest position and said interposer element when in its operative position being effective to project into the recess in said first member and thereby arrest movement between said members.

2. Apparatus as claimed in claim 1 in which said chamber is formed of first and second cavities which converge toward one another at the opening of the chamber; the locking element being located in said first cavity and the interposer element being located in said second cavity.

3. Apparatus as claimed in claim 2 in which each cavity is of cylindrical form, the axes of the cylinders converging toward one another at the second face of the second member.

4. Apparatus as claimed in claim 1 in which the interposer element when at its rest position is nearer the opening of the chamber than the locking element.

5. Apparatus as claimed in claim 3 in which fluid is supplied selectively through a first fluid passage opening into said first cavity and a second fluid passage opening into said second cavity.

6. Apparatus as claimed in claim 1 and including a pad of synthetic plastic material arranged to engage the interposer element when the latter projects from the second member.

7. Apparatus as claimed in claim 1 in which the interposer element, when in its operative position, is supported by said locking element.

8. Apparatus as claimed in claim 3 in which the interposer element and the locking element each consist of a sphere.

9. Apparatus as claimed in claim 1 in which the first member has a plurality of recesses formed in said first face along a line.

10. Apparatus as claimed in claim 9 including means for urging the first member to move relative to said second member along said line in a first direction; means for sensing the relative positions of the first and second members; control means normally operative to supply fluid to said first cavity and in response to an arresting signal from said sensing means, said control means being operative to stop the supply of fluid to said first cavity and to supply fluid to said second cavity.

References Cited

UNITED STATES PATENTS

| | | | |
|---|---|---|---|
| 2,329,182 | 9/1943 | Boynton | 74—527 |
| 2,559,469 | 7/1951 | Scheidemantle | 74—527 |
| 3,164,030 | 1/1965 | Fodrea et al. | 74—531 |
| 3,258,980 | 7/1966 | Swanson | 74—527 |

FRED C. MATTERN, Jr., Primary Examiner

F. D. SHOEMAKER, Assistant Examiner